| (12) | United States Patent | (10) Patent No.: | US 8,397,161 B1 |
|---|---|---|---|
| | Shah et al. | (45) Date of Patent: | Mar. 12, 2013 |

(54) CONTENT COMPILATION AND PUBLISHING SYSTEM

(75) Inventors: Rajal Shah, Fremont, CA (US); Jason Gould, San Jose, CA (US); Charissa Fleischer, San Carlos, CA (US); Renu Bhargava, Fremont, CA (US); Susan Aviva Doshay Garrett, Saratoga, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1075 days.

(21) Appl. No.: 11/539,445

(22) Filed: Oct. 6, 2006

(51) Int. Cl.
*G06F 17/21* (2006.01)

(52) U.S. Cl. ........ 715/249; 715/234; 715/236; 715/239; 715/243

(58) Field of Classification Search .................. 715/234, 715/236, 239, 243, 249
See application file for complete search history.

(56) References Cited

U.S. PATENT DOCUMENTS

| 5,398,335 | A  | * | 3/1995 | Lewis ................................... 1/1 |
| 6,643,652 | B2 | * | 11/2003 | Helgeson et al. ..................... 1/1 |
| 6,697,821 | B2 | * | 2/2004 | Ziff et al. ....................... 707/706 |
| 6,799,299 | B1 | * | 9/2004 | Li et al. ............................ 715/235 |
| 6,996,517 | B1 | * | 2/2006 | Papaefstathiou ................. 703/22 |
| 7,016,963 | B1 | * | 3/2006 | Judd et al. ...................... 709/228 |
| 7,020,681 | B1 | * | 3/2006 | Ayyagari et al. .............. 709/203 |
| 7,024,415 | B1 | * | 4/2006 | Kreiner et al. ......................... 1/1 |
| 7,263,655 | B1 | * | 8/2007 | Carden, Jr. .................... 715/234 |
| 2002/0129016 | A1 | * | 9/2002 | Christfort et al. ................. 707/6 |
| 2002/0133516 | A1 | * | 9/2002 | Davis et al. .................... 707/513 |
| 2004/0236780 | A1 | * | 11/2004 | Blevins et al. ................. 707/102 |
| 2005/0222836 | A1 | * | 10/2005 | Sickels et al. ................... 703/22 |
| 2005/0257158 | A1 | * | 11/2005 | Lombardo .................... 715/751 |
| 2005/0273707 | A1 | * | 12/2005 | Chu et al. ...................... 715/513 |
| 2005/0289446 | A1 | * | 12/2005 | Moncsko et al. .......... 715/501.1 |
| 2006/0167909 | A1 | * | 7/2006 | Mendis et al. ................ 707/101 |
| 2007/0162423 | A1 | * | 7/2007 | Alfandary et al. ................ 707/2 |
| 2007/0239726 | A1 | * | 10/2007 | Weiss et al. ..................... 707/10 |
| 2008/0034056 | A1 | * | 2/2008 | Renger et al. ................. 709/217 |

* cited by examiner

*Primary Examiner* — Doug Hutton, Jr.
*Assistant Examiner* — Andrew Dyer
(74) *Attorney, Agent, or Firm* — Harrity & Harrity, LLP

(57) ABSTRACT

A method and system for facilitating dynamic document creation and publication is provided. A document having a first format may be constructed from a number of content elements maintained in a first database. The document may be transformed into a second format different from the first format. The transformed document may be published and provided to a user.

21 Claims, 6 Drawing Sheets

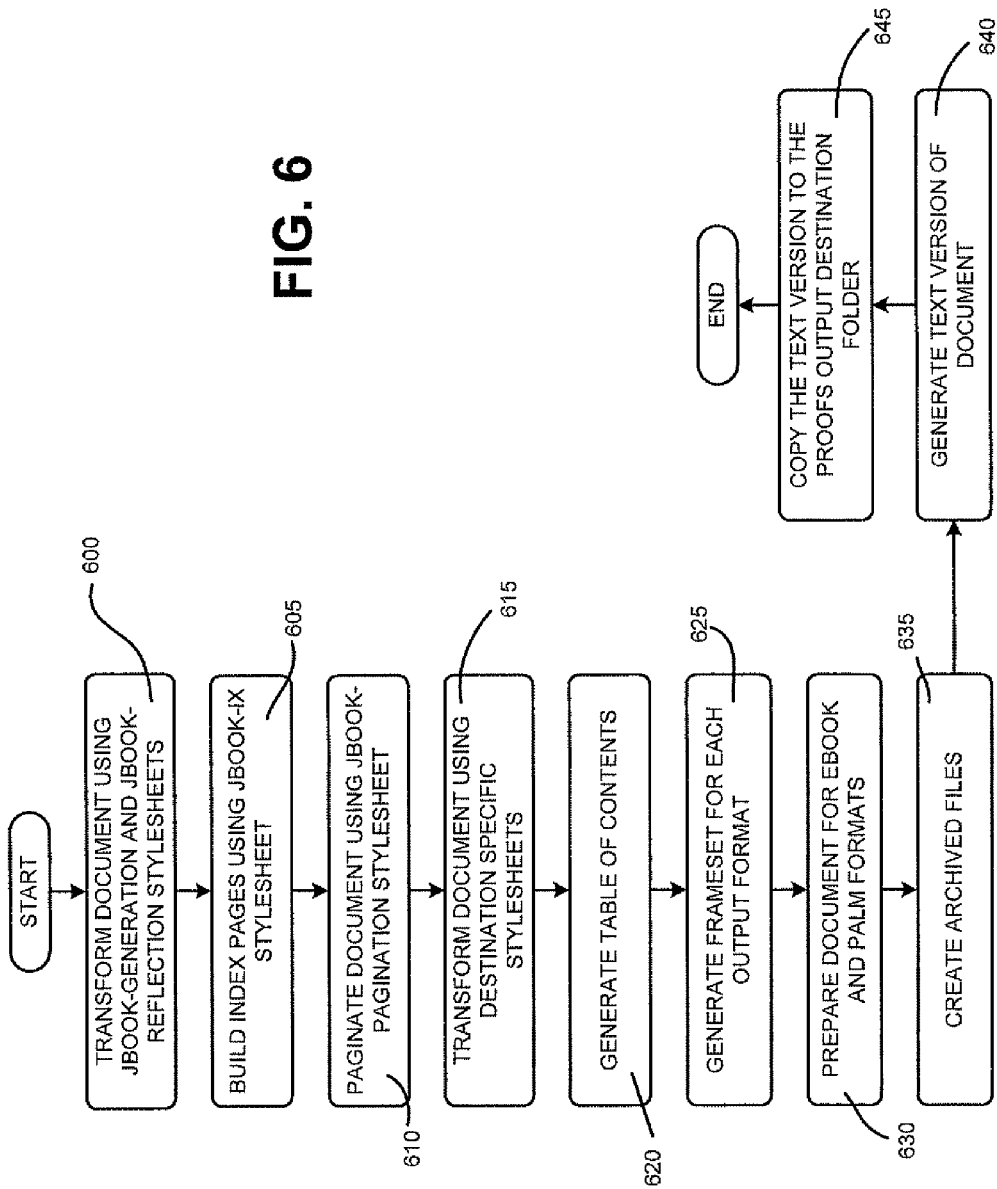

CONTENT COMPILATION AND PUBLISHING SYSTEM

BACKGROUND

1. Field of the Disclosure

The present disclosure relates generally to document generation systems, and more specifically, to systems and methods for generating and publishing documents.

2. Description of the Related Art

The recent explosion in the quantity of information available to consumers, has resulted in an increased demand for content that is specifically tailored to meet the informational demands of its audience. In other words, although more and more information has become available, distilling available information down into what is both relevant and germane has become increasingly challenging. For example, although instruction manuals have long been provided for countless consumer products, these manuals have conventionally been available only in a limited number of select formats, such as a print format or a single type of electronic format. To meet the demands of a modern information consumer, content producers may wish to provide materials in publications having a variety of formats and scopes. Using the above example, the content producer may wish to provide a reference manual having instructions for a group of related products. Alternatively, the content producer may wish to make a manual available in a wider number of formats. Conventional systems lack the flexibility to efficiently meet one or more of these perceived demands.

SUMMARY

One aspect is directed to a method including storing a number of content elements. A document is constructed including at least one stored content element. The document is transformed from a first format into a second format different from the first format. The transformed document is presented to a user.

Another aspect is directed to a system including a first data repository configured to store content elements. A document editing engine may be configured to receive a request to construct a document including at least one of the stored content elements. A publishing engine may be configured to transform the document from a first format into an output format different from the first format, wherein the publishing engine may be further configured to provide the transformed document to a user.

Yet another aspect is directed to a computer-readable medium containing programming instructions that when executed by a computing device cause the computing device to receive a request to construct a document; construct the document from a number of content elements; store the constructed document in a first database; receive a request to publish the document in a first output format; transform the constructed document into the published document having the first output format; and store the published document in a second database.

Still another aspect is directed to a method for creating and publishing a document, including receiving a document creation request from an authoring client associated with a user; constructing the document to include at least one stored content element; receiving a request to publish the document; transforming the document from a first, parseable format, to at least one second output format; and notifying the user upon completion of the transformating.

BRIEF DESCRIPTION OF THE DRAWINGS

The accompanying drawings, which are incorporated in and constitute a part of this specification, illustrate an embodiment of the invention and, together with the description, explain the invention. In the drawings.

FIG. 6 is a flowchart of exemplary processing for transforming a document.

DETAILED DESCRIPTION

The following detailed description refers to the accompanying drawings. The detailed description does not limit the invention.

Aspects of the invention relate to a dynamic content generation system. The content generation system may facilitate collection, management, production, and distribution or publication of content. The content generation system may also facilitate queuing and tracking of document creation or publication requests.

Overview

Figure 1:
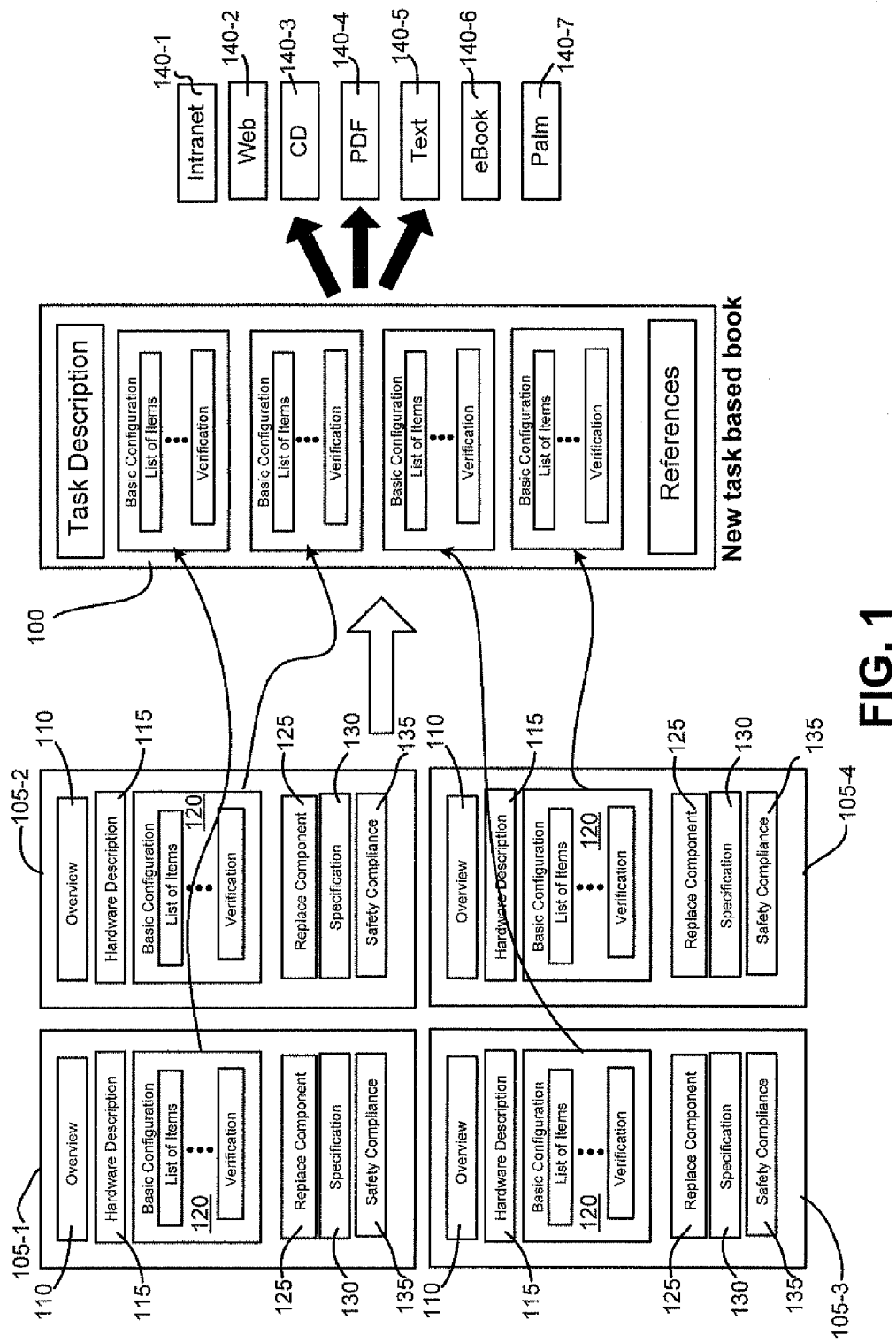
FIG. 1 is a conceptual illustration depicting a dynamic creation of a document based on portions of a number of previously created documents.

FIG. 1 is a conceptual illustration depicting a dynamic creation of a new document 100 based on portions of a number of previously created documents 105-1, 105-2, 105-3, and 105-4 (collectively referred to as original documents 105) each relating to a different product or different versions of the same product. As shown, original documents 105 may each include an overview section 110, a hardware description section 115, a basic configuration section 120, a replacement component section 125, a specification section 130, and a safety compliance section 135.

Consistent with the embodiments described in detail below, each of original documents 105 may be formatted into a parseable or tagged format (e.g., extensible markup language (XML)), thereby enabling a new XML document 100 to be easily created using portions of each of original documents 105, as identified by their respective tags or descriptions. In this example, the basic configuration sections 120 of each of original documents 105 have been compiled together into new XML document 100.

Once new XML document 100 has been created, it may be transformed into various output formats 140 for dissemination to eventual end users. As illustrated, exemplary output formats 140 may include an intranet html (hypertext markup language) format 140-1, a web html format 140-2, a cd format 140-3, a portable document format (pdf) 140-4, a text format 140-5, an eBook format 140-6, and a Palm OS format 140-7. It should be understood that the above described output formats are merely exemplary and that any suitable output format may be used.

By facilitating the efficient and rapid generation and publication of documents based at least in part on legacy or existing documentation, resources and/or time required to generate and publish documents may be greatly diminished.

System Description

Figure 2:
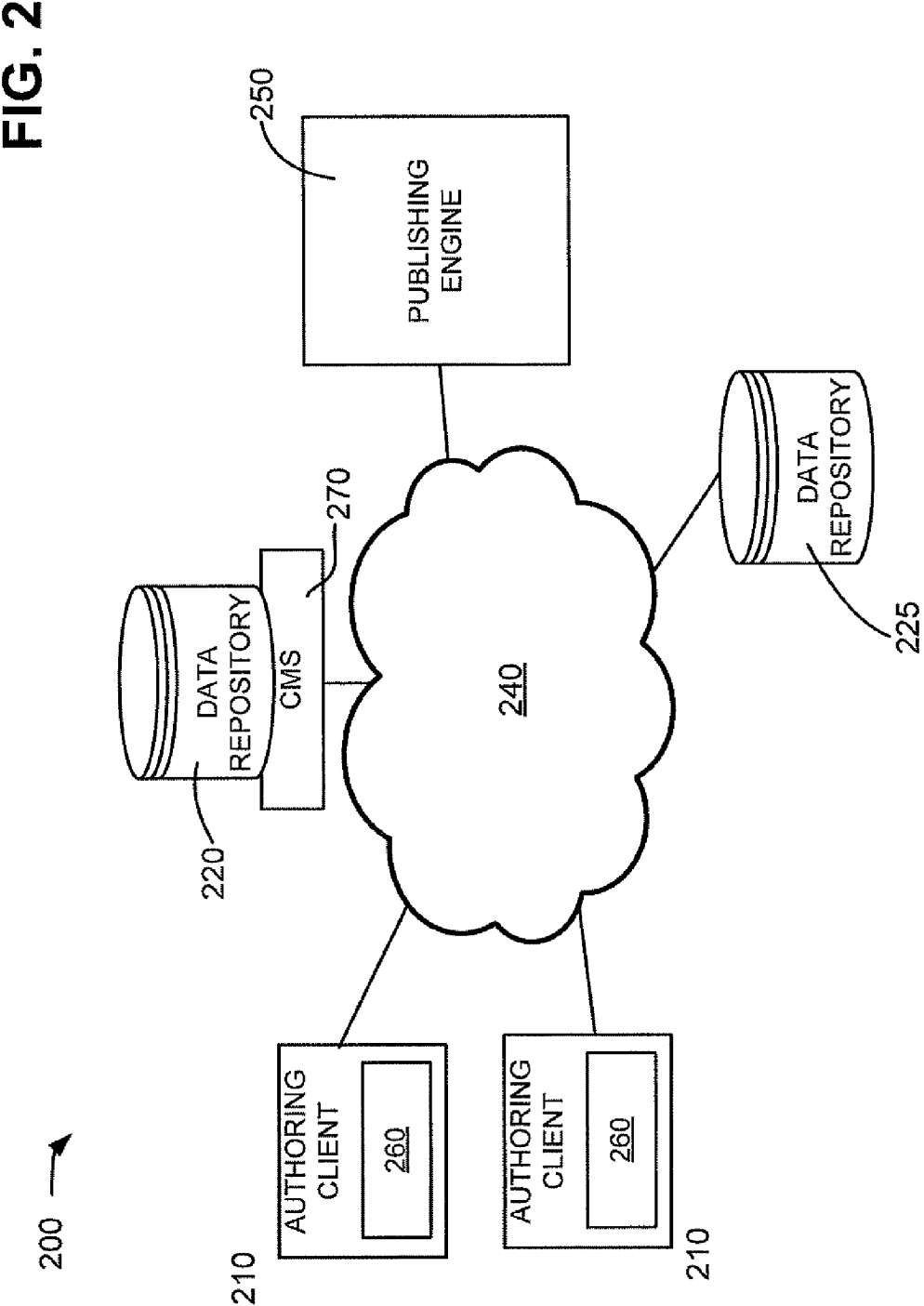
FIG. 2 is an exemplary diagram of a system illustrating aspects of the invention.

FIG. 2 is a diagram of an exemplary system 200. System 200 may include multiple authoring clients 210 that may connect to a first data repository 220 and a publishing engine 250, via a network 240. Publishing engine 250 may be operatively connected to data repositories 220 and 225 via network 240. Network 240 may include a local area network (LAN), a wide area network (WAN), a telephone network, such as the Public Switched Telephone Network (PSTN), an intranet, the Internet, or a combination of networks. Two authoring clients 210, two data repositories 220 and 225, and one publishing engine 250 are illustrated as connected to network 240 for simplicity. In practice, system 200 may include any suitable number of authoring clients 210, data repositories 220, and publishing engines 250.

Authoring clients 210 may include a device, such as a personal computer, a lap top computer, a wireless telephone, a personal digital assistant (PDA), or another type of computation or communication device. Each authoring client 210 may include a document editing engine 260 that enables users of authoring clients 210 to access, retrieve, and/or edit information contained in data repositories 220. In one embodiment, document editing engine 260 may include a stand-alone application for interacting with information in data repository 220. Alternatively, data repository 220 may host a server side application for facilitating access to information via a web browser or other networked application associated with authoring clients 210. In the latter implementation, the effects of differences in operating environments and localities of authoring clients 210 may be minimized. An exemplary server side application may include one or more Citrix® servers.

In one implementation, data repositories 220 and 225 may maintain a collection of documents or document elements for configuration and editing by users of authoring clients 210. Exemplary documents or document elements may include documents formatted as extensible markup language (XML) documents. As is known, XML is a formatting language or convention that enables larger documents to be segmented or parsed based on metadata used therein to describe the content of the document. For example, an overview section of a document may be provided with metadata (e.g., tags) indicating that the section contains overview information. By enabling parsing of document information based on embedded metadata, individual elements of a document may be independently used or modified without requiring searching or retrieval of the entire document. It should be understood that, although the following description discusses XML documents in particular, any parseable document type may be implemented.

In one exemplary embodiment, authoring clients 210 may interact with data repositories 220 and 225 via at least one content management system (CMS) 270. CMS 270 may enable users of authoring devices 210 to locate, retrieve, and create content based on information maintained in data repositories 220 and 225. CMS 270 may then facilitate the maintenance of multiple versions of each piece of information, thereby assisting in locating and editing content. As described above, individual elements of documents created or formatted in XML or another parseable format may be identified and retrieved by CMS 270. For example, a user of authoring client 210 may submit a query to CMS 270 requesting all published basic configuration information for a series of products via document editing engine 260. Because the request is for elements of published documents, CMS 270 may retrieve the requested information based on metadata associated with the documents maintained in data repository 225.

In one implementation, data repository 220 may include author-based information, while data repository 225 may include publication-based information. That is, data repository 220 may include all versions of content or information generated and saved by a user regardless of whether a published document has been generated using the content. Alternatively, data repository 225 may include all versions of content or information published via publishing engine 250. By using at least two data repositories to maintain content, separate versioning systems may be maintained. Depending on the requirements for each data repository 220 and 225, CMS 270 may include individual content management and versioning systems for each data repository 220 and 225.

Once content has been generated or retrieved via CMS 270, a new or updated document may be generated and saved in CMS 270. At this point, the document is ready for publication. As will be described in detail below, the document may be submitted to publishing engine 250 for transformation into any suitable output format, such as hypertext markup language (html), portable document format (pdf), text, personal digital assistant (pda), etc. The manner in which each document is published may be established by a pipeline into which the publication request is submitted. Publishing engine 250 may support a number of different pipelines.

Exemplary Computing

Device Architecture

Figure 3:
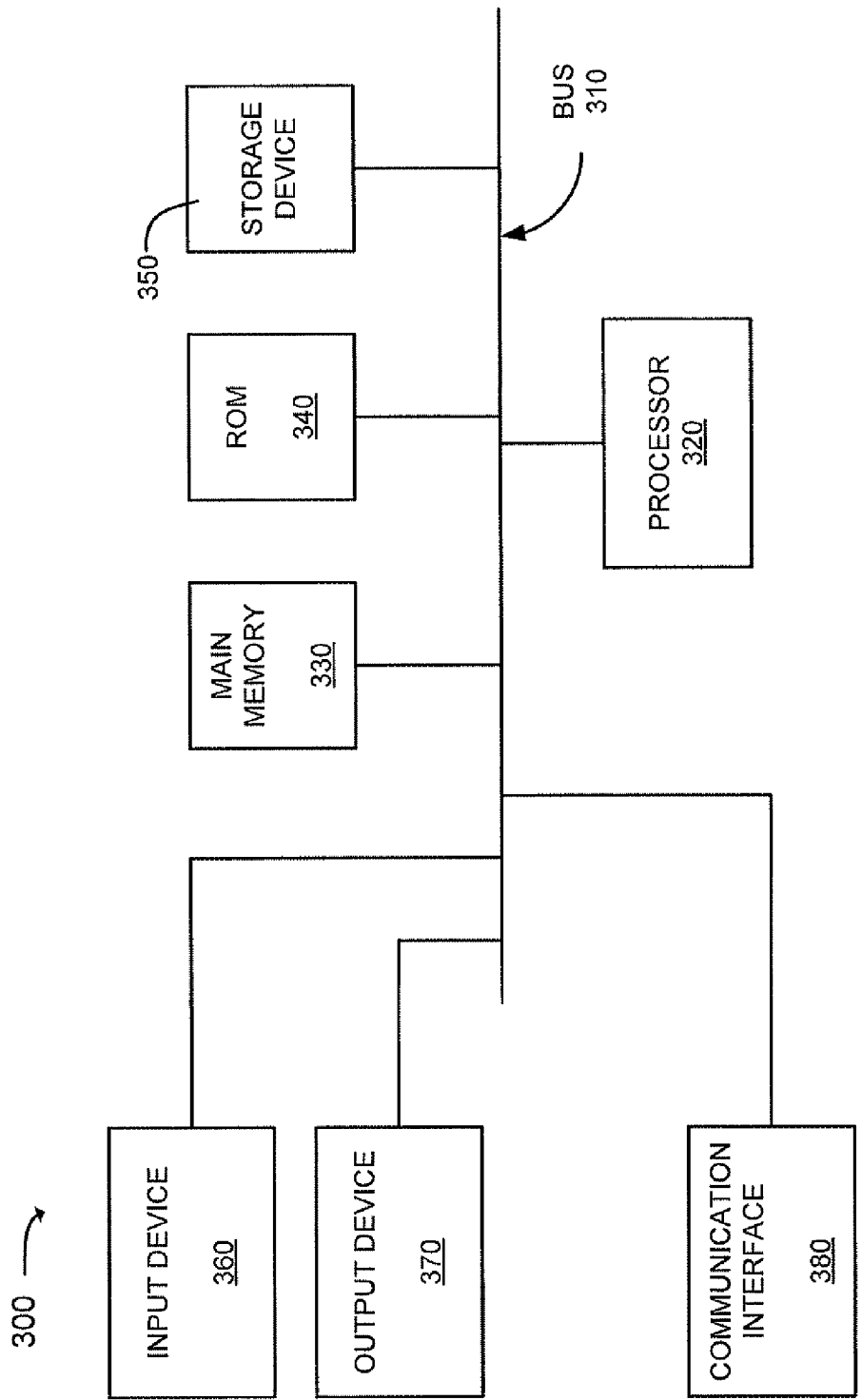
FIG. 3 is a diagram illustrating one of the devices of FIG. 2.

FIG. 3 is an exemplary diagram of a computing device 300, such as one of authoring clients 210, data repositories 220 and 225, or publishing engine 250. Computing device 300 may include a bus 310, a processor 320, a main memory 330, a read only memory (ROM) 340, a storage device 350, an input device 360, an output device 370, and a communication interface 380. Bus 310 may include a path that permits communication among the components of computing device 300.

Processor 320 may include any type of processor, microprocessor, or processing logic that interprets and executes instructions. Main memory 330 may include a random access memory (RAM) or another type of dynamic storage device that may store information and instructions for execution by processor 320. ROM 340 may include a ROM device or another type of static storage device that may store static information and instructions for use by processor 320. Storage device 350 may include one or more magnetic and/or optical recording medium and its corresponding drive.

Input device 360 may include a mechanism that permits a user to input information to computing device 300, such as a keyboard, a mouse, a pen, voice recognition and/or biometric mechanisms, etc. Output device 370 may include a conventional mechanism that outputs information to the user, including a display, a printer, a speaker, etc. Communication interface 380 may include any transceiver-like mechanism that enables computing device 300 to communicate with other devices and/or systems. For example, communication interface 380 may include mechanisms for communicating with another device or system via a network, such as network 240.

Document editing engine 260/CMS 270/publishing engine 250 may be implemented in software and stored in a computer-readable medium, such as memory 330. A computer-readable medium may be defined as one or more physical or logical memory devices and/or carrier waves.

The software instructions defining document editing engine 260/CMS 270/publishing engine 250 may be read into memory 330 from another computer-readable medium, such as data storage device 350, or from another device via communication interface 380. The software instructions contained in memory 330 may cause processor 320 to perform processes that will be described later. Alternatively, hardwired circuitry may be used in place of or in combination with software instructions to implement processes consistent with the present invention. Thus, implementations consistent with the principles of the invention are not limited to any specific combination of hardware circuitry and software.

Exemplary Processing

Figure 4:
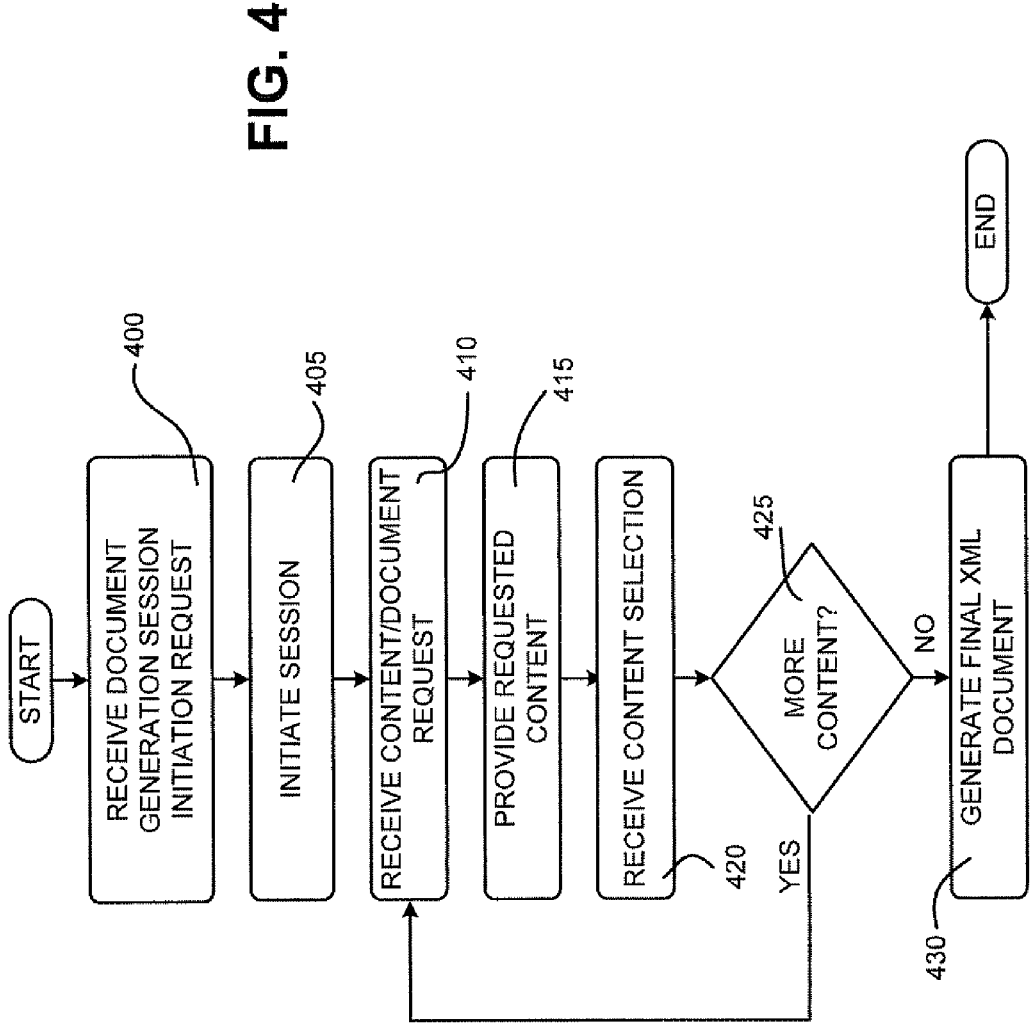
FIG. 4 is a flowchart of an exemplary process for dynamically generating a document.

FIG. 4 is a flowchart of an exemplary process for dynamically generating a document. The processing of FIG. 4 may be performed by one or more software and/or hardware components within data repository 220, such as CMS 270.

Processing may begin upon receipt of a request from authoring client 210 to initiate a document generation/editing session (block 400). CMS 270 may initiate the session (block 405). As described above, the interface between data repository 220 and authoring client 210 may be provided by a server-side application, such as, for example a Citrix® implementation. In this way, all document handling and maintenance may be kept on data repository 220 and is not required to be transmitted to authoring device 210 for manipulation.

CMS 270 may receive a content or document request via authoring client 210 (block 410). For example, the received request may ask for a particular type of content (e.g., basic installation instructions for a product line). Alternatively, the received request may ask for a particular document or version of a document. In yet another implementation, the request may include a search based on metadata or full text keywords, the request covering a variety of content types. CMS 270 may retrieve the requested content from data repository 220 and provide the requested content to authoring device 210 for inclusion into a new or updated document (block 415). Portions of the received content may then be selected via authoring client 210 for inclusion into a new document (block 420). It may be determined whether an additional content request associated with the first request is received (block 425). If so, the process returns to block 410 for receiving an additional content request. If no additional content is requested, the selected content may be formatted or otherwise modified to generate a final XML document (block 430).

In one implementation, document editing engine 260 may receive user interactions with CMS 270 (e.g., keystrokes and/or input device movements/selections) via a web browser application in contact with the server-side application hosted on data repository 220. Via the server-side application, CMS 270 may receive user edits or content submissions/modifications to the presented final XML document. In one implementation, server-side application may receive non-XML formatted documents from authoring client 210 and may provide for conversion of the document to XML or other tagged/parseable format for storage in data repositories 220 and 225.

Figure 5:
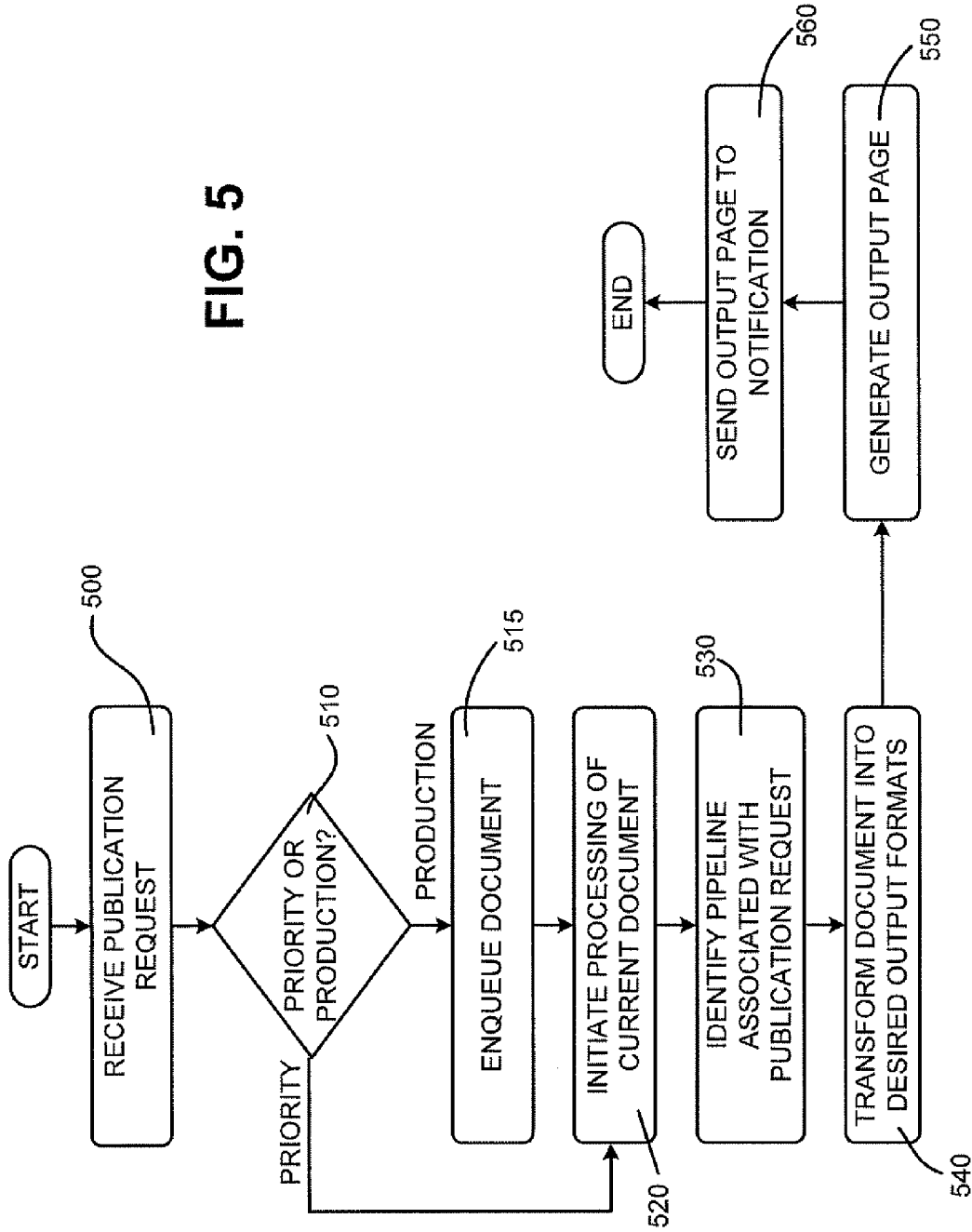
FIG. 5 is a flowchart of an exemplary process for publishing a document.

Regardless of the manner of final XML document construction, an XML document may be submitted to publishing engine 250 for publication. FIG. 5 is a flowchart of an exemplary process for publishing a document. As used herein, the terms "publish" and "publication" refer to any transformation of a generated or selected XML document into a final output form such as a pdf, html, text, etc., that may be stored and/or disseminated to eventual readers. The processing of FIG. 5 may be performed by one or more software and/or hardware components within publishing engine 250. Processing may begin with publishing engine 250 receiving a request from a user to publish a document (block 500). It should be noted that the requesting user may be an author or other entity desiring publication of an existing document.

In one embodiment, the request may be received directly into publishing engine 250 via a server-side application similar to that described above, with respect to document editing engine 260. In an alternative implementation, the request may be received into an offline application separate from publishing engine 250 residing on or available to authoring client 210. In one embodiment, the offline application may reside on a server remote from authoring client 210 and associated with publishing engine 250. The offline application may use an application program interface (API) associated with publishing engine 250 to enable subsequent forwards or retrievals of offline requests to publishing engine 250. By using an offline application and a publishing engine API, requests may be received during periods in which publishing engine 250 is offline. Upon restart of publishing engine 250, requests enqueued at the offline application may be retrieved by publishing engine 250. In one embodiment, users may track a status of an enqueued production request at any time via a remote or web-based tracking application.

Once a publication request has been received, it may be determined whether the publication request is a production request or a priority request based on a request type indicator included in the request (block 510). If it is determined that the publication request is a production request, the request may be placed at the end of a production queue in publishing engine 250 (block 515). However, if it is determined that the publication request is a priority request, the request bypasses the production queue and is forwarded to publishing engine 250 for immediate processing (block 520).

Once received for processing (either from the production queue, or via a priority request determination), a pipeline associated with the request may be identified (block 530). As the used herein, the term "pipeline" may refer to a set of output requirements or criteria for determining the format and/or appearance of the published document. A pipeline may define format parameters, such as stylesheets and the like, as well as designate ownership of the published document, and output types (e.g., pdf, html, ebook, etc.). Publishing engine 250 may be capable of supporting a number of possible document pipelines, for processing either sequentially or asynchronously.

In one implementation, a pipeline may be defined in a user-configurable file or object (e.g., an XML file) usable by publishing engine 250. Each pipeline file may hold a list of step objects, each of which describe a list of instruction interfaces. Upon receipt of a publishing request designating a pipeline, publishing engine 250 may parse the XML file and identify the pipeline details.

The XML document may then be transformed into the designated output formats based on the identified pipeline (block 540). FIG. 6 is a flowchart illustrating exemplary processing for transforming a document, based on a pipeline object associated with the document. Processing may begin by executing a Runup step and transforming the document using "jbook-generation" and "jbook-reflection" stylesheets as identified in the pipeline object (block 600). These applicable stylesheets may be used in assembling the document and applying default templates which are used by all subsequent transformations. Index pages for the published document may be built using a "jbook-ix" stylesheet (block 605).

The published document may be paginated using a "jbook-pagination" stylesheet (block 610). The document may then be transformed from XML into designated output formats upon execution of output-specific steps using destination specific stylesheets as designated in the pipeline identified in the publication request (act 615). Stylesheets may be specific to web, cd, offline html (proofs), and jdoc output formats. Transformation using each of these stylesheets may be sequentially completed with results saved in destination specific folders designated by the respective stylesheet (e.g., in a "post" instruction associated with the output format in the pipeline object). For example, the results of a transformation using a web stylesheet may be stored by publishing engine 250 in a folder labeled "web" which may be easily posted to a web server by an end user.

Next, a table of contents for each of the specific output destinations designated in block 615 may be generated (block 620). In one implementation, tables of contents may be generated in any of four possible formats, including a "frames expanded" format, a "no-frames expanded" format, a "frames collapsed" format, and a "no-frames collapsed" format. Publishing engine 250 may contain stylesheets specific to each of the output destinations in combination with each of the table of content formats (i.e., a web-noframes-collapsed stylesheet, a cd-frames-expanded stylesheet, etc.).

A frameset may be generated for each of the output formats using "jbook-frameset" and "jbook-topframe" stylesheets (block 625). It should be noted that versions of these stylesheets may be specific to each output destination. As in blocks 615 and 620, the results of this transformation may be sent to the output folders specific to the identified output destination.

Next, the published document may be prepared for eBook and Palm® OS formats (block 630). To perform this transformation, publishing engine 250 may use a series of stylesheets specific to these formats (e.g., "jbook-to-html-ebook.xsl and "jbook-to-html-ebook-aux.xsl) which produce html files that may be passed into third party applications used to produce the eBook and Palm output documents. Exemplary application for performing these functions may include Readerworks and ISilo.

An archived file may be created containing the files which were placed in the proofs and cd folders by transformations produced by blocks 615, 620, and 625 (block 635). A text version of the published document may be generated using a "jbook-strip" stylesheet (block 640). The text version may be copied to the proofs output destination folder (block 645). Each output document may be maintained in data repository 225. As discussed above, by maintaining a data repository 225 that includes only published documents, an independent versioning system may be maintained for both authored and published documents, thereby facilitating accurate retrieval and a historical record of all documents.

Although numerous stylesheets are referenced in the description of FIG. 6, it should be understood that the specific stylesheets used are merely exemplary and that any suitable transformation methodologies may be applied without departing from the spirit and scope of the invention.

Returning to FIG. 5, once output formats consistent with the identified pipeline have been generated, a status page may be created that includes links to all of the generated content (block 550). A notification may be sent to the requestor or a group associated with the publication request indicating the status page generated in block 540 (block 560). Using the output page, users may have full access to each of the generated documents.

In one implementation, publication engine 250 may additionally provide document requestors with an ability to monitor or track a status of a publication request. This functionality may be included within the server-side application described above. Alternatively, status notifications may be automatically and periodically generated, thereby updating each requestor without requiring an update request from the requestor.

CONCLUSION

A system and method for generating and publishing or outputting content is described herein. Document elements may be stored in a data repository and used to generate a new document. The new document may be published by transforming the document from a first XML format into a second output format. The published document may be stored in a second data repository.

The foregoing description of exemplary embodiments of the invention provides illustration and description, but is not intended to be exhaustive or to limit the invention to the precise form disclosed. Modifications and variations are possible in light of the above teachings or may be acquired from practice of the invention. For example, while the computer system described herein was described as using XML format to facilitate formation and publication of dynamic content, it should be understood that additional parseable formats may be similarly used.

Moreover, while series of acts have been described with regard to FIGS. 4-6, the order of the acts may be varied in other implementations consistent with the invention. Moreover, non-dependent acts may be implemented in parallel.

It will also be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects of the invention were described without reference to the specific software code—it being understood that one of ordinary skill in the art would be able to design software and control hardware to implement the aspects based on the description herein.

Further, certain portions of the invention may be implemented as "logic" or a "component" that performs one or more functions. This logic may include hardware, such as an application specific integrated circuit or a field programmable gate array, software, or a combination of hardware and software.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed:
1. A method comprising:
  storing, by a server device, content elements:
    each of the content elements being associated with a respective identifier and including one or more portions of a plurality of documents,
    the plurality of documents being formatted in extensible markup language (XML), the one or more portions of the plurality of documents including XML tags, and the identifier, for each of the content elements, including one or more of the XML tags;

receiving, by the server device, a request for a document;

determining, by the server device and based on the request, a plurality of the identifiers, the determined plurality of the identifiers being associated with a plurality of the stored content elements, and the plurality of the stored content elements being associated with at least one of the portions from each of the plurality of documents;

constructing, by the server device and based on the determined plurality of the identifiers, the document in a first format, the constructed document including the respective one or more portions included in the plurality of the content elements;

transforming, by the server device, the constructed document into a plurality of transformed documents, the plurality of transformed document being associated, respectively, with a plurality of second formats, transforming the constructed document including:

determining, based on the request, the plurality of second formats, identifying, based on the plurality of second formats, a plurality of transformation applications, selecting a stylesheet, of a plurality of stylesheets, that corresponds to the plurality of transformation applications, and transforming, using the selected stylesheet and the plurality of transformation applications, the constructed document into the plurality of transformed documents in the plurality of second formats;

providing, by the server device, a status webpage that includes information associated with a status of determining the plurality of the identifiers, constructing the document, and transforming the constructed document; and providing, by the server device, access to the plurality of transformed documents, providing the access to the plurality of transformed documents including:

updating the status webpage, based on forming the plurality of transformed documents, to include a plurality of hyperlinks that enable a user, when selecting one of the plurality of hyperlinks, to access a respective one of the plurality of transformed documents, and sending, to the user and based on updating the status webpage, a notification that the plurality of transformed documents are available to be accessed by the user via the plurality of hyperlinks.

2. The method of claim 1, where constructing the document further comprises:

retrieving the plurality of content elements associated with the plurality of the identifiers; and inserting the retrieved plurality of content elements into the document.

3. The method of claim 1, where the request is based on a search query;

where determining, based on the request, the plurality of the identifiers includes determining the plurality of the identifiers that correspond to the search query; and where constructing the document further comprises:

retrieving, based on the determined plurality of identifiers, the plurality of the content elements, and inserting the retrieved plurality of the content elements into the document.

4. The method of claim 1, where the request further identifies transformation criteria associated with publishing the document; and where transforming the document into the plurality of second formats is further based on the transformation criteria associated with publishing the document.

5. The method of claim 4, where the transformation criteria identifies one or more of the plurality of second formats.

6. The method of claim 1, where the first format includes XML, and where one of the plurality of second formats includes HyperText Markup Language (HTML).

7. The method of claim 1, further comprising:

determining that the request is one of a production request or priority request;

enqueuing, prior to transforming the document, the request into a production queue when the request is the production request; and bypassing the enqueuing of the request into the production queue when the request is the priority request.

8. The method of claim 1, where the request is received from the user, where receiving the request for the document further comprises:

retrieving the request from a computing device that received the request from the user, and where the computing device differs from the server device.

9. The method of claim 1, where the content elements and the constructed document are stored in a first memory, and the plurality of transformed documents are stored in a second memory that differs from the first memory.

10. A system, comprising:

a device to:

store content elements, each of the content elements including a respective portion of portions from a plurality of documents, the respective portion being associated with an extensible markup language (XML) tag, and each of the content elements being associated with an identifier that includes the XML tag;

receive a request to construct a document including a plurality of the content elements associated with two or more of the plurality of documents, determine, based on the request, a plurality of the identifiers associated with, respectively, the plurality of the content elements to be included in the document, acquire, based on the determined plurality of the identifiers, the plurality of the content elements, construct, in a first format, the document to include a plurality of portions included in the acquired plurality of the content elements, transform the constructed document, from the first format into a plurality of transformed documents associated with, respectively, a plurality of second formats that differ from the first format, the device, when transforming the constructed document, being further to:

determine the plurality of second formats based on one or more users associated with the request, identify, based on the plurality of second formats, a plurality of transformation applications, select a stylesheet, of a plurality of stylesheets, that based on the plurality of transformation applications, and convert, using the selected stylesheet and the plurality of transformation applications, the constructed document from the first format to the plurality of second formats; and provide the plurality of transformed documents to the users, the device, when providing the plurality of transformed documents, being further to:

receive, prior to providing the plurality of transformed documents, a tracking request associated with a status of the device with respect to acquiring the plurality of the content elements, constructing the document, and transforming the constructed document, provide, based on receiving the tracking request, a status webpage that includes information associated with the status, update the status webpage to include a plurality of hyperlinks associated with the plurality of transformed documents, the plurality of hyperlinks enabling the users, based on selecting one of the plurality of hyperlinks, to access a corresponding one of the plurality of transformed documents, and send, to the users and based on updating the status webpage, a notification that the plurality of transformed documents are available to be accessed by the users via the plurality of hyperlinks.

11. The system of claim 10, where the first format comprises an XML format, and where one of the plurality of second formats includes HyperText Markup Language (HTML).

12. The system of claim 10, where the device is further to:
store the plurality of the content elements in a first data repository, and
store the plurality of transformed documents in a second data repository device that differs from the first data repository.

13. The system of claim 12, where the device is further to:
maintain the content elements based on authorship, and
maintain the content elements based on output publication.

14. A non-transitory storage device to store programming instructions comprising:

instructions, which when executed by a computing device, cause the computing device to receive a first request, the first request relating to constructing a document;

instructions, which when executed by the computing device, cause the computing device to access stored content elements, each of the content elements being associated with a respective identifier and including one or more portions of documents, the documents being formatted in a parseable extensible markup language (XML) such that the portions of the documents include respective XML tags, and the respective identifier, for each of content elements, including one or more of the XML tags associated with the included one or more portions of the documents;

instructions, which when executed by the computing device, cause the computing device to select, based on the first request, one or more of the identifiers;

instructions, which when executed by the computing device, cause the computing device to construct the document based on the one or more identifiers, the one or more identifiers being associated with one or more of the content elements, and the constructed document including the one or more of the portions included in the one or more of the content elements associated with the one or more identifiers, the constructed document being in a first format;

instructions, which when executed by the computing device, cause the computing device to store the constructed document in a first memory;

instructions, which when executed by the computing device, cause the computing device to receive a second request, the second request relating to publishing the constructed document in a plurality of second formats that differ from the first format;

instructions, which when executed by the computing device, cause the computing device to transform, based on the second request, the constructed document into a plurality of transformed documents, the plurality of transformed document being associated with, respectively, the plurality of second formats, the instructions to transform the document including:

instructions to identify, based on the plurality of second formats, a plurality of transformation applications, instructions to select a stylesheet, of a plurality of stylesheets, that corresponds to the plurality of transformation applications, and instructions to convert, using the plurality of transformation applications and the selected stylesheet, the constructed document into the plurality of transformed documents;

instructions, which when executed by the computing device, cause the computing device to store the plurality of transformed documents in a second memory that differs from the first memory;

instructions, which when executed by the computing device, cause the computing device to provide a status webpage that includes information associated with a real-time status related to the document;

instructions, which when executed by the computing device, cause the computing device to update, after the constructed document is transformed, the status webpage to include a plurality of hyperlinks that enable a user, when selecting one of the plurality of hyperlinks, to access a corresponding one of the plurality of transformed documents; and instructions, which when executed by the computing device, cause the computing device to send, to the user and based on updating the status webpage, a notification that the plurality of transformed documents are available to be accessed by the user via the plurality of hyperlinks.

15. The non-transitory storage device of claim 14, where the instructions to construct the document further include:
instructions to retrieve the one or more of the content elements associated with the selected one or more of the identifiers; and
instructions to insert the one or more of the retrieved one or more of the content elements into the document.

16. The non-transitory storage device of claim 14, where the instructions to transform the document from the first format into the plurality of transformed documents include:
instructions to transform the document based on transformation criteria identified in the second request, where the transformation criteria identifies the plurality of second formats.

17. The non-transitory storage device of claim 14, where the first format includes XML, and
where one of the plurality of second formats includes hypertext markup language (HTML).

18. A method comprising:
receiving, by a server device, a document creation request from an authoring client associated with a user;
constructing, by the server device, the document in a first format
the constructed document including at least one stored content element from each of a plurality of documents,
each of the stored content elements being associated with a respective identifier and including one or more portions of one of the plurality of documents,
the plurality of documents are formatted in a parseable extensible markup language (XML) such that the portions of the plurality of documents include respective XML tags, and
the identifier, for each of content elements, including one or more of the XML tags associated with the included one or more portions of the plurality of documents,
constructing the document including:
selecting, based on the document creation request and for each of the plurality of documents, at least one of the identifiers,
acquiring the respective one or more portions included in the at least one of the stored content elements associated, respectively, with the selected at least one of the identifiers, and
inserting the at least one of the stored content elements into the document;
receiving, by the server device, a request to publish the document;
transforming, by the server device, the document into a plurality of transformed documents associated with a respective plurality of second formats,
transforming the document including:
determining, based on the request to publish the document, the plurality of second formats,
identifying, based on the plurality of second formats, a plurality of transformation applications,
selecting at least one, of a plurality of stylesheets, that corresponds, respectively, to the plurality of transformation applications, and
converting, based on the plurality of transformation applications and the selected at least one stylesheet, the document into the plurality of transformed documents;
providing, by the server device, a status webpage that includes information associated with a real-time status of the document and the plurality of transformed documents; and
notifying, by the server device, the user that the plurality of transformed documents are available for access through the status webpage,
notifying the user including:
updating, after transforming the document, the status webpage to include a plurality of hyperlinks that enable the user to access, via the plurality of hyperlinks, the plurality of transformed documents, and
sending, to the user and based on updating the status webpage, a notification that the plurality of transformed documents are available to be accessed by the user via the plurality of hyperlinks.

19. The method of claim 18, where constructing the document further includes:
retrieving the at least one of the stored content elements associated with the selected at least one of the identifiers; and
inserting the at least one of the retrieved at least one of the content elements into the document.

20. The method of claim 18, where transforming the document is based on transformation criteria identified in the request to publish the document, and
where the transformation criteria identifies the plurality of second formats.

21. The method of claim 18, where the first format includes XML.

* * * * *

UNITED STATES PATENT AND TRADEMARK OFFICE
CERTIFICATE OF CORRECTION

PATENT NO. : 8,397,161 B1
APPLICATION NO. : 11/539445
DATED : March 12, 2013
INVENTOR(S) : Rajal Shah et al.

Page 1 of 1

It is certified that error appears in the above-identified patent and that said Letters Patent is hereby corrected as shown below:

In the Claims:

Column 12, claim 14, line 6, following the word "including" delete "the";

Column 13, claim 18, line 11, following the word "format" insert -- , --.

Signed and Sealed this
Thirtieth Day of April, 2013

Teresa Stanek Rea
*Acting Director of the United States Patent and Trademark Office*

UNITED STATES PATENT AND TRADEMARK OFFICE
CERTIFICATE OF CORRECTION

PATENT NO. : 8,397,161 B1
APPLICATION NO. : 11/539445
DATED : March 12, 2013
INVENTOR(S) : Rajal Shah et al.

Page 1 of 1

It is certified that error appears in the above-identified patent and that said Letters Patent is hereby corrected as shown below:

On the title page
Please correct the Inventors (75) to read as follows:

Rajal Shah, Fremont, CA (US);
Jason Gould, San Jose, CA (US);
Charissa Fleischer, San Carlos, CA (US);
Renu Bhargava, Fremont, CA (US);
Susan Aviva Doshay Garrett, Saratoga, CA (US);
Vasu Chakkera, Livermore, CA (US)

Signed and Sealed this
Twelfth Day of May, 2015

Michelle K. Lee
*Director of the United States Patent and Trademark Office*